United States Patent
Ramesh et al.

(10) Patent No.: US 11,741,996 B1
(45) Date of Patent: Aug. 29, 2023

(54) METHOD AND SYSTEM FOR GENERATING SYNTHETIC VIDEO ADVERTISEMENTS

(71) Applicant: Roku, Inc., San Jose, CA (US)

(72) Inventors: Sunil Ramesh, Cupertino, CA (US); Michael Cutter, Golden, CO (US); Charles Brian Pinkerton, Boulder, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/088,678

(22) Filed: Dec. 26, 2022

(51) Int. Cl.
 *G11B 27/031* (2006.01)
 *G06Q 30/0251* (2023.01)
 *G10L 13/02* (2013.01)

(52) U.S. Cl.
 CPC ....... *G11B 27/031* (2013.01); *G06Q 30/0271* (2013.01); *G10L 13/02* (2013.01)

(58) Field of Classification Search
 None
 See application file for complete search history.

(56) References Cited

U.S. PATENT DOCUMENTS

| | | | | |
|---|---|---|---|---|
| 2008/0140407 A1* | 6/2008 | Aylett | ............... | G10L 21/06 704/260 |
| 2018/0166065 A1* | 6/2018 | Kepner | ............... | A63F 13/30 |
| 2022/0067289 A1* | 3/2022 | Xu | ............... | G06F 40/30 |

OTHER PUBLICATIONS

Romero, "GPT-3 Scared You? Meet Wu Dao 2.0: A Monster of 1.75 Trillion Parameters", (Jun. 5, 2021) https://towardsdatascience.com/gpt-3-scared-you-meet-wu-dao-2-0-a-monster-of-1-75-trillion-parameters-832cd83db484, retrieved Apr. 27, 2023.
Rolando, "Wordsmith: AI-powered Narratives in Human-Friendly Prose", (Apr. 20, 2021) https://d3.harvard.edu/platform-digit/submission/wordsmith-ai-powered-narratives-in-human-friendly-prose, retrieved Apr. 27, 2023.
Dans, "Meet Bertie, Heliograf and Cyborg, The New Journalists on the Block", (Feb. 6, 2019) https://www.forbes.com/sites/enriquedans/2019/02/06/meet-bertie-heliograf-and-cyborg-the-new-journalists-on-the-block/?sh=471f52e8138d, retrieved Apr. 27, 2023.

* cited by examiner

*Primary Examiner* — Eileen M Adams
(74) *Attorney, Agent, or Firm* — McDonnell Boehnen Hulbert & Berghoff LLP

(57) ABSTRACT

In one aspect, an example method includes (i) obtaining a set of user attributes for a user of a content-presentation device; (ii) based on the set of user attributes, obtaining structured data and determining a textual description of the structured data; (iii) transforming, using a text-to-speech engine, the textual description of the structured data into synthesized speech; and (iv) generating, using the synthesized speech and for display by the content-presentation device, a synthetic video of a targeted advertisement comprising the synthesized speech.

17 Claims, 6 Drawing Sheets

METHOD AND SYSTEM FOR GENERATING SYNTHETIC VIDEO ADVERTISEMENTS

USAGE AND TERMINOLOGY

In this disclosure, unless otherwise specified and/or unless the particular context clearly dictates otherwise, the terms "a" or "an" mean at least one, and the term "the" means the at least one.

SUMMARY

Content creators can generate videos for distribution via digital channels. Such digital channels can include websites, social media, and streaming services.

There is wide variety of structured data available on the Internet and from other sources. Structured data includes data types with patterns that make them easily searchable. For instance, structured data includes data that is in a standardized format having a well-defined structure such that the format and meaning of the data is explicitly understood. As such, structured data is easily accessible using computer algorithms. Structured data can include text data, image data, and/or numeric data. Examples of structured data include sports box scores, weather forecasts, financial information, real estate records, entertainment summaries, etc.

If a content creator is able to produce videos utilizing such structured data, the structured data would serve as an abundant source for video generation. Hence, it is desirable to leverage structured data to produce videos, such as advertisements.

In one aspect, an example computing system is described. The computing system is configured for performing a set of acts including (i) obtaining a set of user attributes for a user of a content-presentation device; (ii) based on the set of user attributes, obtaining structured data and determining a textual description of the structured data; (iii) transforming, using a text-to-speech engine, the textual description of the structured data into synthesized speech; and (iv) generating, using the synthesized speech and for display by the content-presentation device, a synthetic video of a targeted advertisement comprising the synthesized speech.

In another aspect, an example method performed by a computing system is described. The method includes (i) obtaining a set of user attributes for a user of a content-presentation device; (ii) based on the set of user attributes, obtaining structured data and determining a textual description of the structured data; (iii) transforming, using a text-to-speech engine, the textual description of the structured data into synthesized speech; and (iv) generating, using the synthesized speech and for display by the content-presentation device, a synthetic video of a targeted advertisement comprising the synthesized speech.

In another aspect, a non-transitory computer-readable medium is described. The non-transitory computer-readable medium has stored thereon program instructions that upon execution by a computing system, cause performance of a set of acts. The set of acts include (i) obtaining a set of user attributes for a user of a content-presentation device; (ii) based on the set of user attributes, obtaining structured data and determining a textual description of the structured data; (iii) transforming, using a text-to-speech engine, the textual description of the structured data into synthesized speech; and (iv) generating, using the synthesized speech and for display by the content-presentation device, a synthetic video of a targeted advertisement comprising the synthesized speech.

DETAILED DESCRIPTION

I. Overview

Content creators desire to create videos quickly and efficiently. As noted above, there is a wide variety of structured data available on the Internet and from other sources. When presented as text, the structured data might not appeal to some audiences. However, the structured data may be more interesting to an audience when presented in video form.

Moreover, if a synthetic video that is indistinguishable from a real video can be generated from structured data in an automated or semi-automated fashion, it may be more efficient and cost-effective to generate the synthetic video than to generate a real video from the structured data through traditional video production and editing processes.

One situation in which it can be advantageous to create synthetic video is in advertising. Accordingly, disclosed herein are methods and systems for generating advertisements using structured data, which can save time and cost (e.g., on actors, writers, and traditional production) in providing advertisement content to audiences, especially targeted advertisements containing images, audio, products, and/or services of interest to specific audiences.

In an example method, a computing system obtains a set of user attributes for a user of a content-presentation device and, based on the set of user attributes, obtains structured data and determines a textual description of the structured data. The computing system transforms, using a text-to-speech engine, the textual description of the structured data into synthesized speech. The computing system then generates, using the synthesized speech and for display by the content-presentation device, a synthetic video of a targeted advertisement comprising the synthesized speech.

In some examples, the computing system can leverage deep learning techniques to make a synthetic advertisement in which the content and/or speech of the advertisement is catered directly to the user, where the synthetic advertisement looks as if it is composed of live, real camera-recorded shots and images of objects (and sometimes actors). Hence, an audience may be unable to distinguish the synthetic advertisement from a real recorded advertisement.

Various other features of these systems and methods are described hereinafter with reference to the accompanying figures.

II. Example Architecture

A. Video-Generation System

Figure 1:
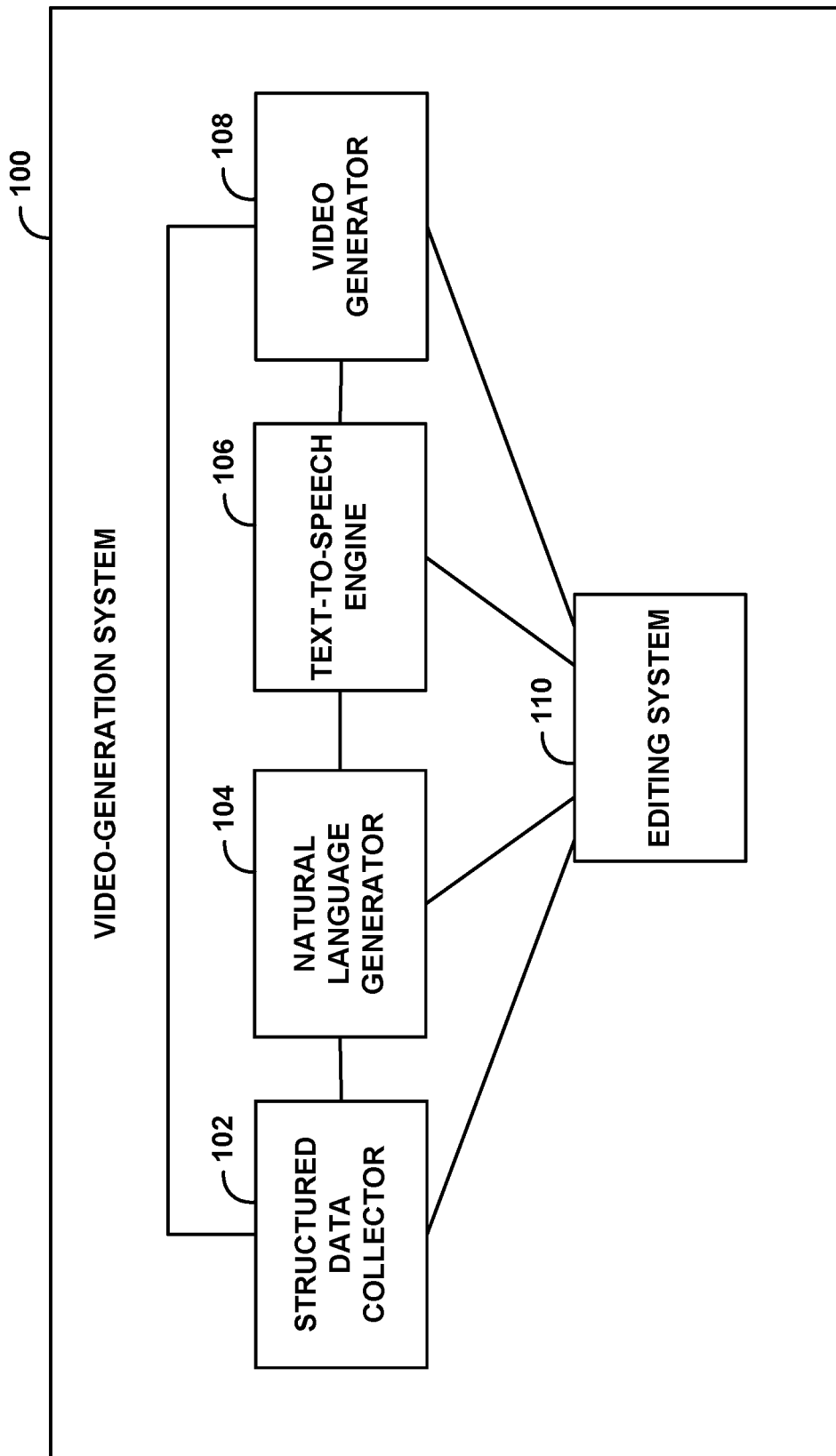
FIG. 1 is a simplified block diagram of an example video-generation system in which various described principles can be implemented.

FIG. 1 is a simplified block diagram of an example video-generation system 100. The video-generation system 100 can include various components, such as a structured data collector 102, a natural language generator 104, a text-to-speech engine 106, a video generator 108, and/or an editing system 110.

The video-generation system 100 can also include one or more connection mechanisms that connect various components within the video-generation system 100. For example, the video-generation system 100 can include the connection mechanisms represented by lines connecting components of the video-generation system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The video-generation system 100 and/or components thereof can take the form of a computing system, an example of which is described below.

In some instances, the video-generation system 100 can include multiple instances of at least some of the described components.

In some cases, the video-generation system 100 can also include a content-presentation device (not shown) configured for presenting (e.g., displaying) videos. A content-presentation device can be or include a television set, a set-top box, a television set with an integrated set-top box, a video game console, a desktop computer, a laptop computer, a tablet computer, a mobile phone, a speaker (e.g., a soundbar mounted below the television set), or a home appliance, among other possibilities.

B. Computing System

Figure 2:
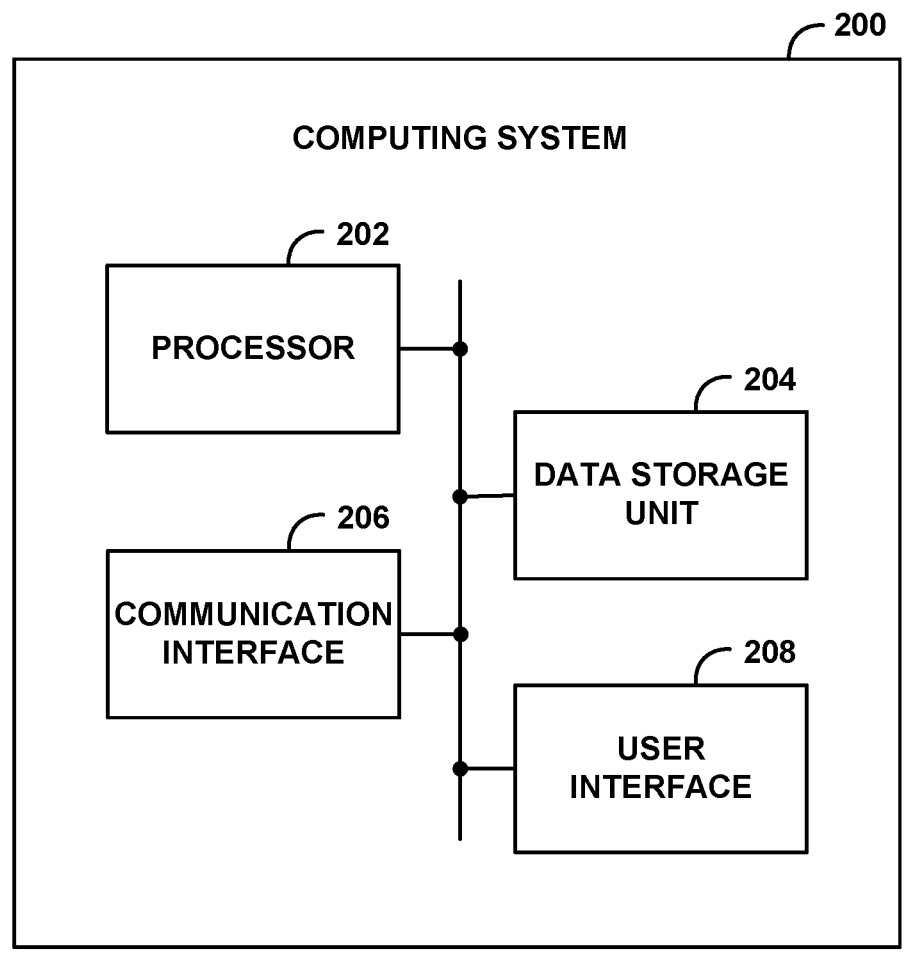
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the video-generation system 100 and/or components thereof can take the form of a computing system, such as the computing system 200. In some cases, some or all these entities can take the form of a more specific type of computing system, such as a content-presentation device.

III. Example Operations

The video-generation system 100 and/or components thereof can be configured to perform and/or can perform one or more operations. Examples of these operations and related features will now be described with reference to FIGS. 3-6.

A. Operations Related to Obtaining a Set of User Attributes

To begin, the structured data collector 102 or other component of the video-generation system 100 can obtain a set of one or more user attributes for a user of a content-presentation device.

To obtain the set of user attributes for the user, for example, the structured data collector 102 can access a user profile stored in local memory of the content-presentation device or stored in other memory in the video-generation system 100, with the user profile including the set of user attributes. The structured data collector 102 can also obtain the set of user attributes by receiving data from a computing system, with the data being input by a user via a user interface (e.g., a keyboard and/or microphone) of the computing system, such as a series of user inputs received to establish a user profile that includes the set of user attributes.

The set of user attributes can include a name of the user, a geographic area of the user (e.g., a current country, state, county, and/or address of the user), an employer of the user, a race and ethnicity of the user, an age of the user, a gender of the user, a marital status of the user, a salary of the user, a user-preferred language (e.g., English, Spanish, Japanese), a user-preferred secondary language, a search history of the user, a description or list of user interests/hobbies, a description or list of user-preferred products, a description or list of user-preferred services, a list of products or services purchased by the user, a user-preferred travel destination, a user-preferred spokesperson (e.g., a celebrity or other individual), a physical attribute of the user (e.g., skin color, hair color, body type, etc.), a user-preferred video content genre, and/or a user-preferred music genre or artist, among other possibilities. The set of user attributes can also include identifiers of products, services, people, places, things, etc., or characteristics thereof, that the user does not want to be shown in targeted advertisements.

In some implementations, obtaining the set of user attributes can involve receiving a content consumption history of the user, which can be stored in, and accessed from, memory and, in some cases, tracked by the video-generation system 100. A content consumption history of the user can take the form of data indicating media content (e.g., video, music) that the user has played out using the content-presentation device or other content-presentation devices that are communicatively coupled to the video-generation system 100 (e.g., a smartphone or television that is on the same local network as the content-presentation device). Such media content can include movies, television shows, music, podcasts, and the like. The content consumption history can also include metadata identifying other information about the media content that the user played out, such as a list of actors, directors, and/or musical artists associated with the media content. Further, in some cases, the content consumption history of the user can include web browsing data, such as a list of advertisements that the user has searched for or clicked on during web sessions and any product/service metadata associated therewith.

Having received the content consumption history, the structured data collector 102 can analyze the content consumption history to determine one or more user attributes to include in the set of user attributes. For example, if the user has watched a threshold quantity of movies starring a particular actor and/or watched content starring that particular actor for a threshold amount of time, the structured data collector 102 can determine the particular actor to be a user-preferred spokesperson for an advertisement.

In some implementations, obtaining the set of user attributes can involve receiving social media data for the user, which can be stored in, and accessed from, memory and, in some cases, tracked by the video-generation system 100. In some cases, the social media data can take the form of or be included in the user profile described above, or can be separate from the user profile. The social media data can include any user information specified in any one or more of the user's social media profiles. Further, in some cases, the social media data can include a social media content consumption history of the user, which can include, for instance, advertisements viewed on or otherwise accessed via social media platforms and posts viewed via social media platforms. In some cases, the content consumption history can include social media data.

Having received the social media data, the structured data collector 102 can analyze the social media data to determine one or more user attributes to include in the set of user attributes, such as in the same way user attributes are determined using the content consumption history.

In some implementations, a user profile specifying the set of user attributes can be created at least in part using the content consumption history and/or the social media data of the user.

In line with the present disclosure, any one or more user attributes of the set of user attributes described above can be used to personalize advertisement content to the user, as will be described in more detail below.

B. Operations Related to Obtaining Structured Data

The structured data collector 102 can obtain structured data based at least in part on the obtained set of user attributes. As noted above, structured data includes data that is in a standardized format having a well-defined structure such that the format and meaning of the data is explicitly understood. Examples of structured data include sports box scores, weather forecasts, financial information, real estate records, entertainment summaries, images of products or services, product or service descriptions, other types of images (e.g., stock images, background images, etc.), and other forms of text (e.g., descriptions of content depicted in images), among other possibilities.

In some cases, structured data can be tagged/annotated with various parameters including target demographics (e.g., age, gender, marital status, race, etc.) with which the structured data is associated, product information (e.g., corporation, brand, description, image, price, availability, condition), service information (e.g., corporation, description, price, availability, images), geographic information, and more. As such, the structured data collector 102 can use the set of user attributes as search queries for structural data and compare user attributes from the set of user attributes with the structural data parameters and select structural data having parameters that match one or more of the user attributes. For example, the structured data collector 102 can select one or more images and text having parameters that match one or more user attributers of the set of user attributes, such as one or more images of the user-preferred product or the user-preferred service. In some cases, the parameters can take the form of keywords.

In some examples, the structured data collector 102 can obtain structured data from a database. The database can store records of structured data. The records may be organized by subject matter and date, for instance.

Additionally or alternatively, the structured data collector 102 can extract structured data through data scraping. For instance, the structured data collector 102 can use web scraping, web harvesting, and/or web data extraction to extract structured data from websites.

The structured data collector 102 can also obtain structured data by receiving data from a computing system, with the data being input by a user via a user interface (e.g., a keyboard and/or microphone) of the computing system. The data can take the form of keywords to assist with searching for structured data that is tagged with such keywords, or can take the form of the structured data itself, such as in the form of images and/or text.

Figure 3:
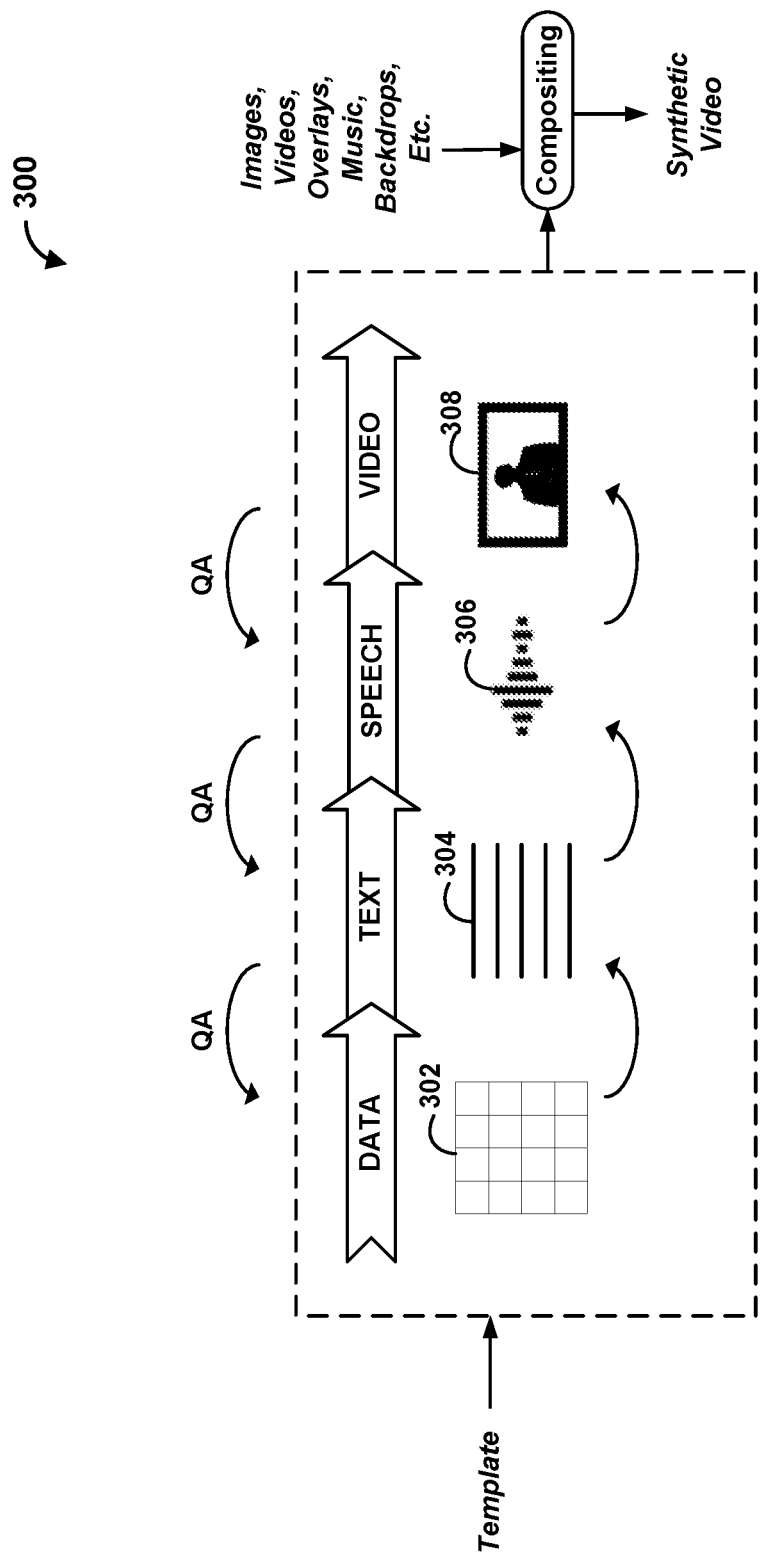
FIG. 3 is a diagram of an example video-generation process and related concepts.

FIG. 3 illustrates the role of such structured data in the video-generation process. More specifically, FIG. 3 is a diagram 300 of an example video-generation process. As shown in FIG. 3, structured data 302 is obtained as input for the video-generation process.

In some implementations, the set of user attributes can be used to select an advertisement template from a plurality (e.g., hundreds or thousands) of advertisement templates stored in memory. To facilitate this, the video-generation system 100 can store or otherwise have access to mapping data that maps each of a plurality of advertisement templates with a corresponding user attribute (or attributes). These advertisement templates can include templates for a certain types of products (e.g., a template for a healthcare product versus a template for a food product), certain types of services (e.g., a template for car repair), or other types of people, places, or things being advertised (e.g., a template for a sports team). These advertisement templates can also include templates of varying duration (e.g., a template for a 30-second advertisement versus a template for a 15-second advertisement).

As an example of template selection, the structured data collector 102 can determine from the set of user attributes that the user is in a particular demographic (e.g., a thirty-five year old male) and/or has a specified interest in sports, and can thus select an advertisement template for a sports-related product. As another example, the structured data collector 102 can determine from the set of user attributes that the user lives in an urban area and can thus select an advertisement template that has images or footage of urban environments. As yet another example, the set of user attributes can specify a user-preferred tone (e.g., happy, somber, angry, etc.) and thus the structured data collector 102 can use the mapping data to select an advertisement template having that particular tone. Other examples are possible as well.

A given advertisement template can be or include pre-existing video (e.g., synthetic video or pre-recorded video) having various types of placeholders in which images, text, audio, human (e.g., pre-recorded video of a human, or synthetically-generated rendering of a human), or other information can be inserted.

As an example, the advertisement template can include one or more temporal placeholders, such as a temporal portion (e.g., two seconds worth of frames) left empty of a larger sequence of frames that make up the advertisement.

As another example, the advertisement template can include one or more spatial placeholders, such as a region of one or more frames left empty (e.g., a backdrop behind synthetically-generated actors) or a designated location for an overlay, in which images and/or text can be placed.

As yet another example, the advertisement template can include one or more audio placeholders for sound effects and/or background music for the advertisement.

As yet another example, the advertisement template can include one or more script placeholders, such as placeholders in which to insert a product/service name or description.

In some implementations, when an advertisement template has been selected, the set of user attributes can also be used to select the structured data to be inserted into the template. As an example, the structured data collector 102 can determine from the set of user attributes that the user is in a particular demographic (e.g., a thirty-five year old male) and lives in a particular location (e.g., New York City), and can thus select an advertisement template for a sports-related product, and obtain/insert images, video, text, etc. for a New York City sports team in the advertisement template.

To facilitate obtaining structured data for insertion into a selected advertisement template, the template might include a set of data fields for which corresponding images and/or text is/are desired.

In some examples, the template can include an identifier that specifies a source of the structured data (e.g., a website). With this approach, the structured data collector 102 can use the identifier to extract the structured data that is appropriate for the template.

Other factors can be used to obtain the structured data as well, in addition to the set of user attributes. As an example, the structured data collector 102 can determine and consider a time of year or current weather associated with a known address or other geographic area associated with the user. For instance, if the user lives in New York City and the structured data collector 102 determines that it is currently the winter season in New York City, the structured data collector 102 can collect images and text for winter-themed products or services, such as warm clothes, heating appliances, holiday gifts, etc., and/or can select a background image or video for the advertisement that is associated with the time of year and weather (e.g., a background in which it is snowing outside). The time of year considered can also extend to a time of year for a season for a type of sports. For example, if the set of user attributes specifies a user-preferred sports team and that team's sport is currently in-season, the structured data collector 102 can collect images and text associated with that sports team. Additionally or alternatively, the structured data collector 102 can determine and consider a time of day (e.g., morning, afternoon, night), and search for structured data based at least in part on the time of day.

In some implementations, during the process of obtaining the structured data, or during the process of generating the synthetic video described in more detail below, the video-generation system 100 can use the set of user attributes to determine a spokesperson (i.e., a human, or talking animal/object, depicted in the synthetic video that speaks synthesized speech in accordance with the targeted advertisement) to be included in the synthetic video. For example, if the set of user attributes specifies a set of user-preferred physical characteristics (e.g., hair, skin color, height, weight), the video-generation system 100 can use those physical characteristics to select a set of characteristics of a spokesperson according to which to render the spokesperson in the synthetic video. As another example, if the set of user attributes indicates a particular celebrity as a user-preferred spokesperson (e.g., based on the user having watched a threshold quantity of movies starring a particular actor), the video-generation system 100 can generate a synthetic version of that celebrity for the advertisement or can generate a spokesperson having one or more of the same physical characteristics as that celebrity. Other examples are possible as well.

C. Operations Related to Determining a Textual Description

In line with the discussion above, the natural language generator 104 or other component of the video-generation system 100 can determine a textual description of the structured data based at least in part on the obtained set of user attributes.

As an example, the natural language generator 104 or other component of the video-generation system 100 can receive a predetermined script for an advertisement and insert one or more of the user attributes into the script. For instance, the script can include one or more placeholders including the user's name and occupation, which can be filled in using the set of user attributes. As a specific example, the script can begin with the language "Hello, [INSERT NAME]," where "[INSERT NAME]" is a placeholder in which to insert the user's name from the set of user attributes.

As another example, the natural language generator 104 or other component of the video-generation system 100 can use at least one of the user attributes of the set to select a predetermined script or portion of a script stored in memory, using mapping data that maps each of a plurality of different user attributes, or a respective combination of multiple user attributes, to a corresponding script or portion of a script. For instance, for a female user below age thirteen, a script or portion of a script can be chosen that has words that are more commonly found in advertisements for adolescent or pre-adolescent females.

The act of determining the textual description of the structured data based on the set of user attributes can involve generating, using the natural language generator 104, a textual description of the structured data that includes a textual representation of at least one of the user attributes from the set of user attributes. In some cases, the textual description of the structured data is or includes a narrative advertising a product or service related to the structural data, such as a user-preferred product or service specified in the set of user attributes. For example, in situations where the structured data collector 102 selects text having parameters that match one or more user attributers of the set of user attributes, such as descriptions or names of the user-preferred product or the user-preferred service, the natural language generator 104 can determine a textual description of the structured data that includes the selected text.

In some cases, the natural language generator 104 can refer to the set of user attributes and, if the set of user attributes includes a user-preferred language, the natural language generator 104 can generate the textual description in the user-preferred language, using vocabulary and grammar from that language.

FIG. 3 depicts the textual description 304 of the structured data 302. In some cases, the natural language generator 104 can include one or machine learning models that produces human-readable text (e.g., sentences) in one or more languages using structured data.

One example of a natural language generator is the GPT-3 language model developed by OpenAI. A similar example of a natural language generator is Wu-Dao. Other examples include Automated Insight's Wordsmith and the Washington Post's Heliograf.

In some cases, the natural language generator can include a deep learning-based synthesis model that uses deep neural networks (DNNs) to produce a script for an advertisement. The deep learning-based synthesis model can be trained using training data that includes scripts for existing advertisements. Using deep learning, the video-generation system 100 can create scripts that accurately resemble the cadence, structure, and vocabulary found in advertisements and that target specific audiences and user attributes.

In some examples, the natural language generator 104 generates the textual description 304 using a multi-stage approach. In a first stage, the natural language generator 104 interprets the structured data 302. Interpreting the structured data 302 can involve identifying a pattern in the structured data 302. For instance, structured data can identify a product name and user rating for the product. During the interpreting stage, the natural language generator can identify the product name and rating.

A next stage can include document planning. During the document planning stage, the natural language generator 104 organizes features in the structured data to create a narrative. In some cases, the natural language generator 104 uses rule-based templates to pair identified features with targeted sequences. For instance, in the case of a product for sale, the narrative may include an opening paragraph describing a common problem for which the product was designed to solve, as well as other paragraphs describing the product, its cost, and other information.

Additional stages can include a sentence aggregation stage, where multiple sentences can be aggregated together, and a grammaticalization stage that validates the generated text according to syntax, morphology, and orthography rules.

In some examples, the natural language generator 104 refines and improves the generated text using back translation and/or paraphrasing. These techniques can improve the readability of the textual description 304.

Other factors can be used to determine the textual description as well, in addition to the set of user attributes, such as the determined time of year and/or time of day. As an example, the natural language generator 104 can use the time of year to generate, or select existing, textual descriptions of structured data obtained based on the structural data's relation to the time of year.

The editing system 110 can include a computing system that allows a user to review the textual description 304 generated by the natural language generator 104 as part of a quality assurance process. For instance, the editing system 110 can present the textual description 304 on a display, and a user of the editing system 110 can approve or reject the textual description 304 using a user interface of the editing system 110.

D. Operations Related to Generating Synthesized Speech

In line with the discussion above, the text-to-speech engine 106 can transform the textual description 304 into synthesized speech 306. The text-to-speech engine 106 can take any of a variety of forms depending on the desired implementation.

By way of example, the text-to-speech engine 106 can include a deep learning-based synthesis model that uses deep neural networks (DNNs) to produce artificial speech from text. The deep learning-based synthesis model can be trained using training data that includes recorded speech and the associated input text. Examples of deep learning-based synthesis models include WaveNet developed by DeepMind, Tacotron developed by Google, and VoiceLoop developed by Facebook.

In situations where the natural language generator 104 generates the textual description 304 in a user-preferred language specified by the set of user attributes, the text-to-speech engine 106 can be configured to transform the textual description into synthesized speech that includes a pronunciation and accent associated with the user-preferred language.

In some examples, the text-to-speech engine 106 obtains a speech sample for a speaker, and transform the textual description 304 into the synthesized speech 306 using the speech sample. For instance, a deep learning-based synthesis model can transfer learning from speaker verification to achieve text-to-speech synthesis. More specifically, the deep learning-based synthesis model can use pre-trained speaker verification models as speaker encoders to extract speaker embeddings from a speech sample for a speaker. Extracting the speaker embeddings allows the deep learning-based synthesis model to learning the style and characteristics of the speaker, so that the synthesized speech output by the deep learning-based synthesis model sounds like the speaker. The speech sample can be audio extracted from a sample video.

The editing system 110 can include a computing system that allows a user to review the synthesized speech 306 generated by the text-to-speech engine 106 as part of a quality assurance process. For instance, the editing system 110 can playback the synthesized speech 306, and a user of the editing system 110 can approve or reject the textual description 304 using a user interface of the editing system 110.

E. Operations Related to Generating a Synthetic Video

In line with the discussion above, the video generator 108 uses the synthesized speech 306 to generate, for display by the content-presentation device of the user, a synthetic video 308 of a targeted advertisement including the synthesized speech 306. The synthetic video 308 can also include the structural data discussed above, such as one or more images, text, etc. associated with the product or service being advertised. Various types of synthetic videos 308 are contemplated. The complexity of the video generator 108 can vary depending on the desired implementation.

Upon generating the synthetic video 308, the video generator 108 can transmit the synthetic video 308 to the content-presentation device for display. Alternatively, if the video-generation system 100 is a computing system within the content-presentation device, the video generator 108 can instruct a display device of the content-presentation device to display the synthetic video 308.

In some examples, the synthetic video 308 includes one or more images and an accompanying audio track comprising the synthesized speech 306. For instance, the synthetic video 308 can include one or more images of a soda can, and the synthesized speech 306 can explain the appeal of the type of soda being advertised. Alternatively, the synthetic video 308 can include one or more images and/or video clips related to a travel destination, and the synthesized speech 306 can explain details about the appeal of the travel destination. The video generator 108 can generate these types of videos by combining the synthesized speech 306 with images, videos, overlays, music, and/or backdrops. For instance, an editor can use editing system 110 to select images, videos, overlays, music, and/or backdrops for different parts of the synthetic video 308, and the video generator 108 can render a video having the appropriate features based on the selection(s).

In other examples, the synthetic video 308 can depict a human (e.g., also referred to as spokesperson, as noted above) speaking the synthesized speech 306. In this implementation, the video generator 108 can generate the synthetic video 308 using a sample video of the human speaking and a video-synthesis model. The human speaking in the sample video can be a real human or a computer-generated (e.g., virtual) human. The video generator 108 can use the video-synthesis model to determine facial expressions for the human while the human speaks the synthesized speech. Additionally, the video generator 108 can use the video-synthesis model to determine facial expressions for the human while the human speaks the synthesized speech.

In some examples, the video-synthesis model is a temporal generative adversarial network (GAN). For instance, the video-synthesis model can include multiple discriminators that cooperate to perform a spatial-temporal integration of a sample video of the human and the synthesized speech to form the synthetic video 308, which looks as if the human had spoken the textual description 304 in a live, real camera recording.

Figure 4:
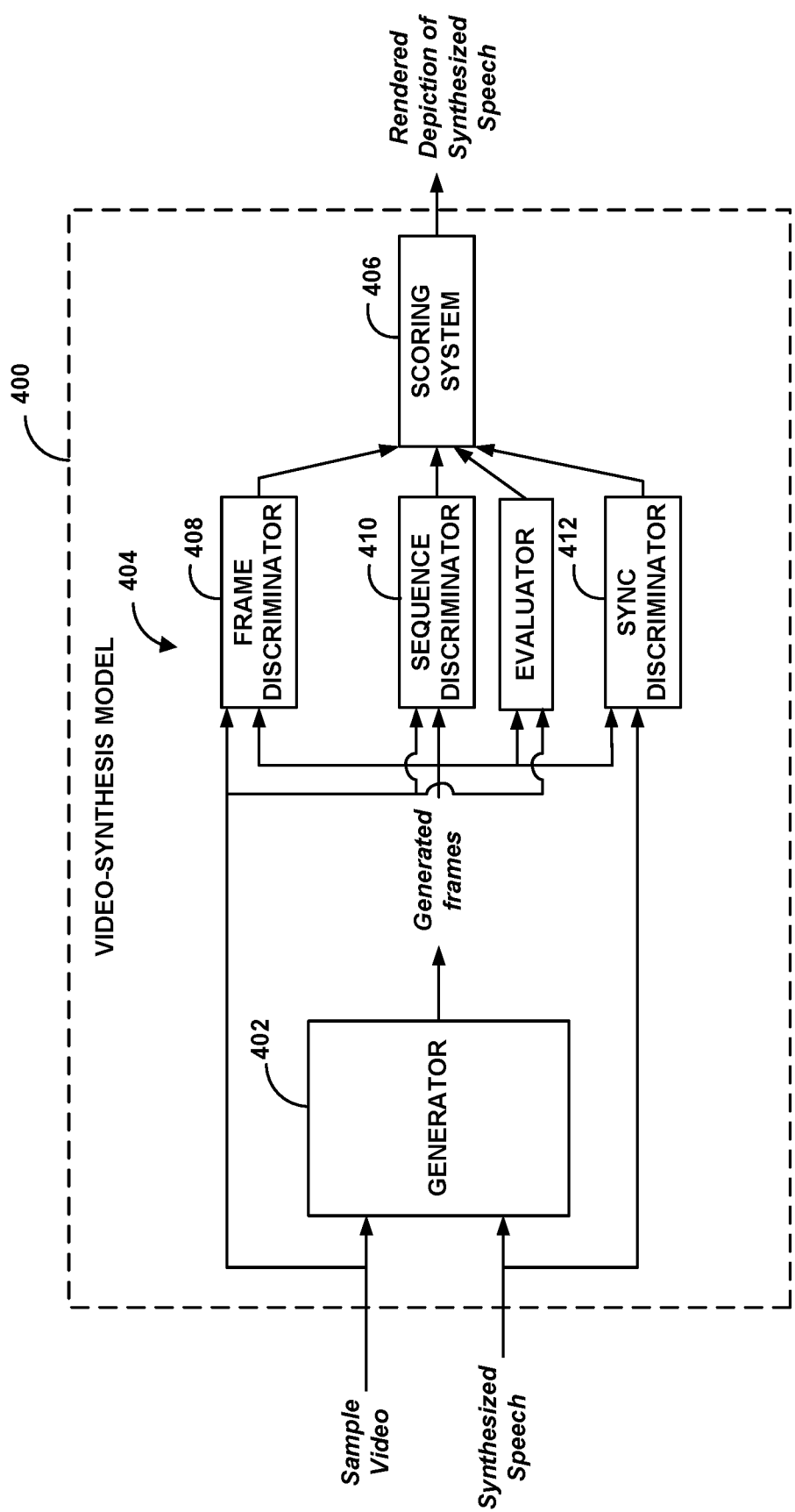
FIG. 4 is a simplified block diagram of an example video-synthesis model.

FIG. 4 is a simplified block diagram of an example video-synthesis model 400. As shown in FIG. 4, the video-synthesis model includes a generator 402, an ensemble of discriminators 404, and a scoring system 406.

The generator 402 receives as input a sample video of a human speaking and synthesized speech. The generator 402 has an encoder-decoder structure and includes a content encoder, identity encoder, and a noise generator, and frame decoder. In one example, the human's identity (e.g., facial expressions and, optionally, gestures) is encoded by the identity encoder using a first convolutional neural network (CNN) that converts an image from the sample video into a first latent space representation. Additionally, an audio frame (e.g., 0.2 seconds) of the synthesized speech is encoded by the content encoder using a second CNN that converts the audio frame into a second latent space representation. The frame decoder then combines the first latent space representation, the second latent space representation, and noise generated by the noise generator into a latent representation for a generated frame. This process is repeated for different audio frames to generate multiple generated frames.

The ensemble of discriminators 404 include multiple discriminators that allow for generation of difference aspects of videos. By way of example, as shown in FIG. 4, the ensemble of discriminators 404 includes a frame discriminator 408, a sequence discriminator 410, and a synchronization discriminator 412.

The frame discriminator 408 distinguishes between real and synthetic frames using adversarial training. For example, the frame discriminator 404 can include a CNN that determines, at a frame-level whether a generated frame, from the generator 402, is realistic in terms of facial expressions and, optionally, gestures. The frame discriminator 404 can be trained using frames from the sample video. The frame discriminator 408 can output a score indicative of whether a generated frame is realistic.

The sequence discriminator 410 determines whether a sequence of generated frames is real or synthetic using adversarial training. For example, the sequence discriminator 410 can include a CNN with spatial-temporal convolutions that extracts and analyzes movements across generated frames of the sequence. The sequence discriminator 410 can be trained using sequences of frames from the sample video. The sequence discriminator 410 can output a score indicative of whether a sequence of frames is realistic.

The ensemble of discriminators 404 can also include other types of discriminators that allow for generating other aspects at the frame or sequence of frames level.

Finally, the synchronization discriminator 412 determines whether the generated frames are in or out of synchronization with a corresponding portion of the synthesized speech. For example, the synchronization discriminator 412 can include an audio encoder that computes an audio embedding, a video encoder that computes a video embedding, and a distance calculator that computes a Euclidian distance between the embeddings as a measure of synchronization. The synchronization discriminator 412 can be trained using corresponding audio portions and sequences of frames from the sample video. The synchronization discriminator 412 can output a score indicative of whether the synchronization between the synthesized speech and the generated sequence of frames is realistic.

The scoring system 406 utilizes scores output by the ensemble of discriminators to determine whether to render the generated frames as a synthetic video. For instance, the scoring system 406 can be configured to determine a weighted average of scores about by the frame discriminator 408, the sequence discriminator 410, and the synchronization discriminator 412 and compare the weighted average to a threshold. Based on determining that the weighted average exceeds a threshold, the scoring system can output the generated frames as a depiction of the synthesized speech. Whereas, based on determining that the weighted average does not exceed the threshold, the scoring system can cause forgo outputting the generated frames and, optionally, continue to generate new frames in an effort to achieve a more realistic video. As such, in some examples, the scoring system 406 servers as a gatekeeper that regulates whether or not the generated frames look realistic enough to merit rendering a synthetic video using the generated frames.

Alternatively, the scoring system 406 can be configured to compare scores output by individual discriminators of the ensemble of discriminators 404 to respective thresholds. Upon determining that the scores output by each of the discriminators of the ensemble of discriminators 404 exceeds a respective threshold, the scoring system can output the generated frames as a depiction of the synthesized speech.

The output of the video-synthesis model 400 is a rendered depiction of the human in the sample video speaking the synthesized speech 306. In some examples, the video generator 108 combines the rendered depiction of the human speaking the synthesized speech 306 with images, videos, overlays, music, and/or backdrops. For instance, an editor can use editing system 110 to select images, videos, overlays, music, and/or backgrounds/backdrops for different parts of the synthetic video 308, and the video generator 108 can render a video having the appropriate features based on the selection(s). As one example, an editor can select a video snippet to be displayed (e.g., as an overlay or occupying the entire frame) between two instances of synthesized speech.

Figure 5:
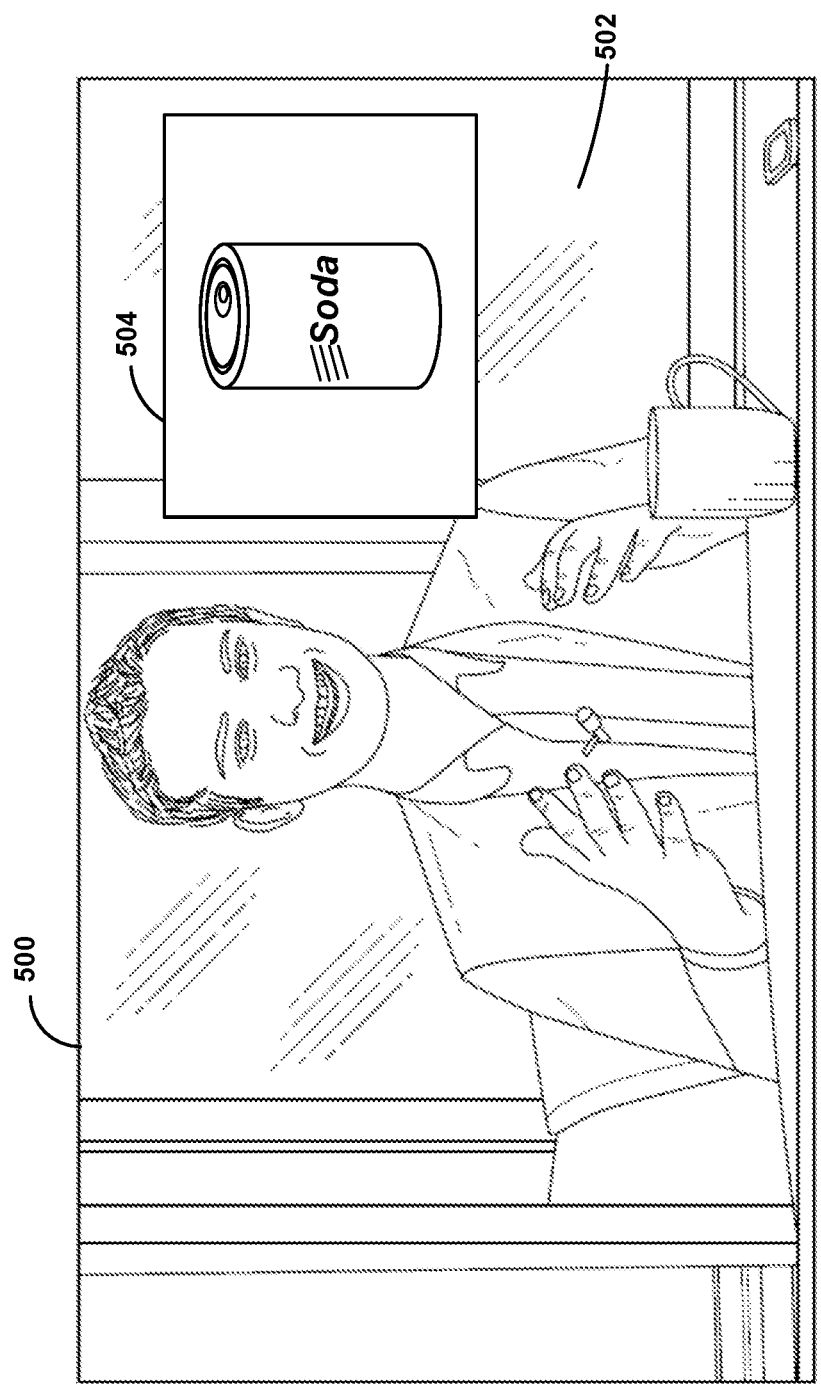
FIG. 5 is a conceptual illustration of an example frame of a synthetic video advertisement.

FIG. 5 conceptually illustrates an example frame 500 of a synthetic video advertisement. As shown in FIG. 5, the frame 500 depicts a human advertising soda. The frame 500 also includes a backdrop 502, an image 504 of a soda can, and other objects (e.g., a desk, mug, and cellular phone). The video-generation system 100 can generate the frame 500 of the synthetic video by using user attributes to obtain structured data for the soda and determine a textual description from the structured data, transforming the textual description into synthesized speech, and generating a rendering of a human speaking the synthesized speech.

In some examples, by generating the synthetic video using a video-synthesis model, such as the video-synthesis model 400, the frame of the synthetic video (and the other frames of the video) may be indistinguishable from reality. Further, by leveraging the structured data, the synthetic video can be produced in an efficient manner, decreasing the time and labor costs typically required in producing, editing, and publishing videos.

Furthermore, the use of user attributes enable the video-generation system 100 to efficiently tailor synthetic advertisements for a variety of different users, and in some cases having the same general synthetic advertisement modified in different ways depending on the target user. By way of example, in the context of the soda advertisement of FIG. 5, a first user might be an office worker that speaks Spanish as their first language, and so the synthetic speech spoken by the human in the synthetic video of the soda advertisement can be in Spanish. As another example, a second user might work at a factory and speak English as their first language, and so the backdrop 502 of the frame 500 (and of other frames) can be selected to depict a factory floor and the synthetic speech can be in English. As yet another example, a third user might speak Japanese as their first language, and so the synthetic speech spoken by the human in the synthetic video of the soda advertisement can be in Japanese. Other elements of the synthetic video, such as the clothing and/or appearance of the human can take different forms as well, depending on the user attributes. An advertisement targeted to a user who is an office worker can include a human in a suit and tie, whereas to target that advertisement to a user who is a factory worker, the human can be generated or modified to wear factory worker clothes.

In some cases, the act of generating a synthetic video of a target advertisement can involve modifying an existing synthetic video of the target advertisement in one or more ways, such as by changing a language of the synthetic speech, changing one or more images or text displayed, changing words in the script, etc.

In some implementations, the video-generation system 100 can also use the products or services present in structural data and advertised in synthetic advertisements as a basis for modifying one or more objects in a synthetically-generated program segment. For example, a synthetic video of a newscaster reporting the news can be generated with various ad breaks in which synthetic advertisements are generated and inserted. There may also be a mug on the desk in front of the newscaster. In a situation where a synthetic a car commercial for a specific car manufacturer is generated in the manner described above and inserted into one such ad break, the synthetic video of the newscaster can be modified such that the mug includes a logo for the car manufacturer of the preceding synthetic advertisement. Other examples are possible as well.

In some implementations, the video-generation system 100 can create or dynamically-adjust the synthetic advertisement based on the user's current environment. For example, if the video-generation system 100 estimates or determines the time of day at which the synthetic advertisement is being presented, the video-generation system 100 can select a background color to mirror or contrast an expected ambient light in the user's viewing environment that is associated with that time of day.

Additionally or alternatively, the video-generation system 100 can use a camera mounted on the content-presentation device and/or an ambient light sensor to detect an ambient light that is currently present in the viewing environment and use the detected ambient light color and brightness to select a background or other visual element of the synthetic advertisement, and can further adjust that background or other visual element if a change in the ambient light is detected (e.g., due to a user closing blinds, so as to reduce the amount of sunlight in the viewing environment).

Further, in some implementations, the video-generation system 100 can be configured to blend a background of an image of the structured data (e.g., an image of the advertised product or service) with a background of the synthetic advertisement. For example, the structured data might include an image of a person wearing a sweater, selected based on user attributes that indicate the target user is living in an area in which it is winter and the temperature is cold. The image might have a solid, light grey background, and the video-generation system 100 can sample one or more pixels from that background and select or generate a background for an entire frame or series of frames of the synthetic advertisement that has the same solid, light grey color. Other examples are possible as well.

F. Example Method

Figure 6:
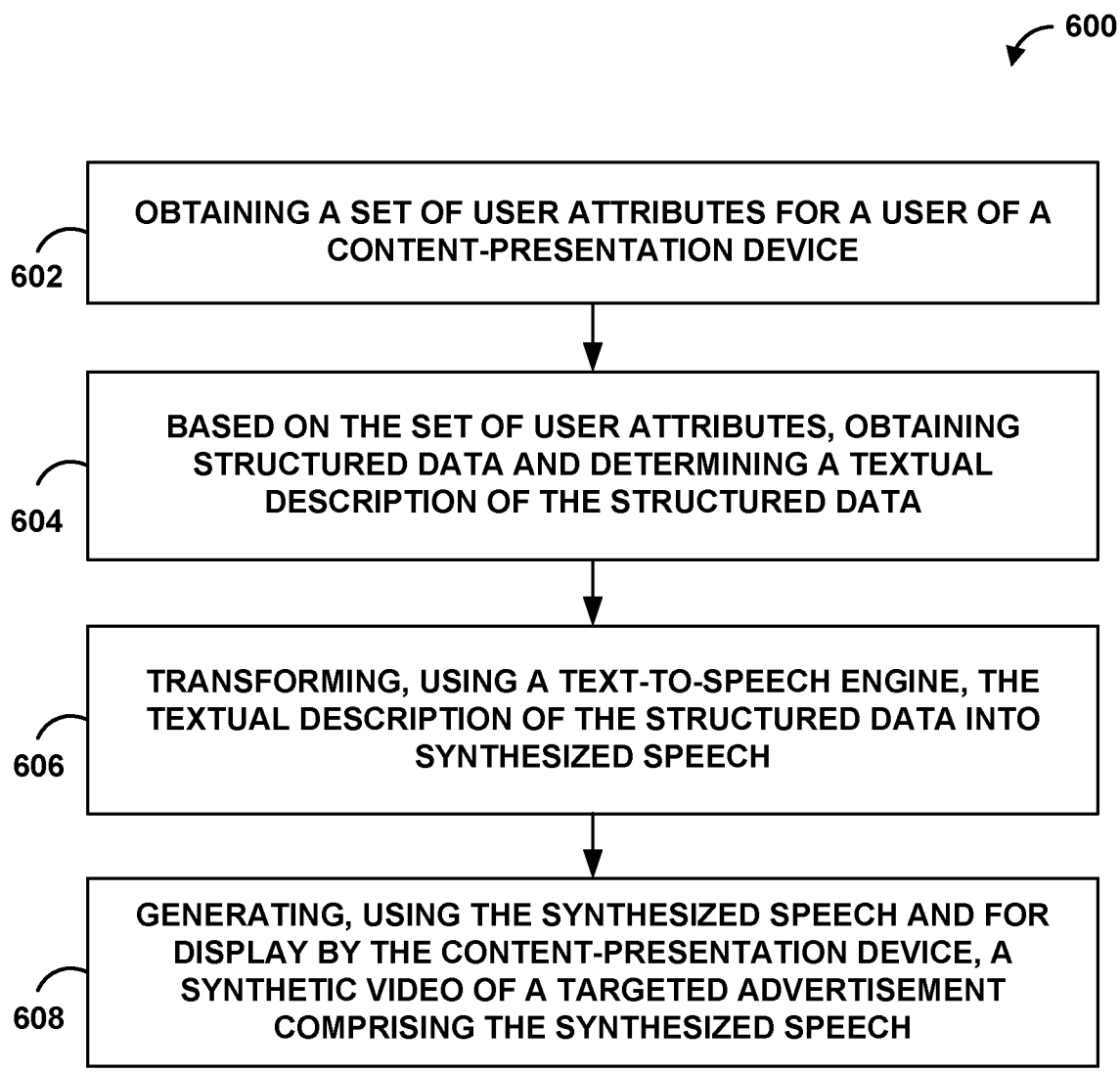
FIG. 6 is a flow chart of an example method.

FIG. 6 is a flow chart illustrating an example method 600. The method 600 can be carried out by a video-generation system, such as the video-generation system 100, or more generally, by a computing system. At block 602, the method 600 includes obtaining a set of user attributes for a user of a content-presentation device. At block 604, the method 600 includes based on the set of user attributes, obtaining structured data and determining a textual description of the structured data. At block 606, the method 600 includes transforming, using a text-to-speech engine, the textual description of the structured data into synthesized speech. At block 608, the method 600 includes generating, using the synthesized speech and for display by the content-presentation device, a synthetic video of a targeted advertisement comprising the synthesized speech.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computing system comprising a processor and a non-transitory computer-readable medium having stored thereon program instructions that upon execution by the processor, cause performance of a set of acts comprising:
    obtaining a set of user attributes for a user of a content-presentation device;
    based on the set of user attributes, obtaining structured data and determining a textual description of the structured data;
    transforming, using a text-to-speech engine, the textual description of the structured data into synthesized speech; and
    generating, using the synthesized speech and for display by the content-presentation device, a synthetic video of a targeted advertisement comprising the synthesized speech, wherein:
    obtaining the structured data and determining the textual description of the structured data based on the set of user attributes comprises selecting one or more images and text having parameters that match one or more user attributes of the set of user attributes and determining a textual description of the structured data that includes the selected text, and
    generates the synthetic video of the targeted advertisement comprises generating a synthetic video of a targeted advertisement that includes the selected one or more images.

2. The computing system of claim 1, wherein determining the textual description of the structured data based on the set of user attributes comprises generating, using a natural language generator, a textual description of the structured data that includes a textual representation of at least one of the user attributes from the set of user attributes.

3. The computing system of claim 1, wherein the set of user attributes comprises one or more of a name of the user, a geographic area of the user, or an employer of the user.

4. The computing system of claim 1, wherein:
    the set of user attributes comprises a user-preferred language, and
    determining the textual description of the structured data based on the set of user attributes comprises generating, using a natural language generator, a textual description of the structured data in the user-preferred language.

5. The computing system of claim 1, wherein:
    the set of user attributes comprises a user-preferred product or a user-preferred service,
    the structured data comprises one or more images of the user-preferred product or the user-preferred service, and
    the textual description of the structured data comprises a narrative advertising the user-preferred product or the user-preferred service.

6. The computing system of claim 1, wherein:
    the set of acts further comprises determining one or more of a time of year and current weather associated with a geographic area of the user,
    obtaining the structured data is further based on one or more of the determined time of year or the determined current weather.

7. The computing system of claim 1, wherein:
    the set of acts further comprises selecting a set of characteristics of an advertisement spokesperson based on the set of user attributes,
    generating the synthetic video comprises generating a synthetic video including a spokesperson for the targeted advertisement, the spokesperson being synthetically-generated according to the selected set of characteristics.

8. The computing system of claim 1, wherein:
    the set of acts further comprises selecting, from a plurality of advertisement templates, an advertisement template corresponding to one or more user attributes of the set of user attributes,
    generating the synthetic video comprises generating the synthetic video according to the selected advertisement template.

9. A method performed by a computing system, the method comprising:
    obtaining a set of user attributes for a user of a content-presentation device;
    based on the set of user attributes, obtaining structured data and determining a textual description of the structured data;

transforming, using a text-to-speech engine, the textual description of the structured data into synthesized speech; and generating, using the synthesized speech and for display by the content-presentation device, a synthetic video of a targeted advertisement comprising the synthesized speech, wherein:

obtaining the structured data and determining the textual description of the structured data based on the set of user attributes comprises selecting one or more images and text having parameters that match one or more user attributers of the set of user attributes and determining a textual description of the structured data that includes the selected text, and generating the synthetic video of the targeted advertisement comprises generating a synthetic video of a targeted advertisement that includes the selected one or more images.

10. The method of claim 9, wherein determining the textual description of the structured data based on the set of user attributes comprises generating, using a natural language generator, a textual description of the structured data that includes a textual representation of at least one of the user attributes from the set of user attributes.

11. The method of claim 9, wherein the set of user attributes comprises one or more of a name of the user, a geographic area of the user, or an employer of the user.

12. The method of claim 9, wherein:
the set of user attributes comprises a user-preferred language, and determining the textual description of the structured data based on the set of user attributes comprises generating, using a natural language generator, a textual description of the structured data in the user-preferred language.

13. The method of claim 9, wherein:
the set of user attributes comprises a user-preferred product or a user-preferred service, the structured data comprises one or more images of the user-preferred product or the user-preferred service, and the textual description of the structured data comprises a narrative advertising the user-preferred product or the user-preferred service.

14. The method of claim 9, further comprising determining a time of year and current weather associated with a geographic area of the user, wherein obtaining the structured data is further based on one or more of the determined time of year or the determined current weather.

15. The method of claim 9, further comprising selecting a set of characteristics of an advertisement spokesperson based on the set of user attributes, wherein generating the synthetic video comprises generating a synthetic video including a spokesperson for the targeted advertisement, the spokesperson being synthetically-generated according to the selected set of characteristics.

16. The method of claim 9, further comprising selecting, from a plurality of advertisement templates, an advertisement template corresponding to one or more user attributes of the set of user attributes, wherein generating the synthetic video comprises generating the synthetic video according to the selected advertisement template.

17. A non-transitory computer-readable medium having stored thereon program instructions that upon execution by a computing system, cause performance of a set of acts comprising:

obtaining a set of user attributes for a user of a content-presentation device;

based on the set of user attributes, obtaining structured data and determining a textual description of the structured data;

transforming, using a text-to-speech engine, the textual description of the structured data into synthesized speech; and generating, using the synthesized speech and for display by the content-presentation device, a synthetic video of a targeted advertisement comprising the synthesized speech, wherein:

obtaining the structured data and determining the textual description of the structured data based on the set of user attributes comprises selecting one or more images and text having parameters that match one or more user attributes of the set of user attributes and determining a textual description of the structured data that includes the selected text, and generating the synthetic video of the targeted advertisement comprises generating a synthetic video of a targeted advertisement that includes the selected one or more images.

* * * * *